United States Patent [19]

Meier

[11] Patent Number: 5,781,355
[45] Date of Patent: Jul. 14, 1998

[54] STRESS-FREE SUPPORT

[75] Inventor: Hans-Jürgen Meier, Aalen, Germany

[73] Assignee: Carl-Zeiss-Stiftung, Heidenheim, Germany

[21] Appl. No.: 802,927

[22] Filed: Feb. 20, 1997

[30] Foreign Application Priority Data

Feb. 21, 1996 [DE] Germany .................. 296 03 024.4 U

[51] Int. Cl.$^6$ .................... G02B 7/182; F16M 13/00
[52] U.S. Cl. .................... 359/871; 359/872; 359/846; 359/848; 248/603; 248/604; 248/901
[58] Field of Search .................... 359/223, 224, 359/225, 226, 871, 872, 846, 848, 849, 820, 822, 823, 824; 248/603, 604, 901

[56] References Cited

U.S. PATENT DOCUMENTS 4,226,507  10/1980  Fuschetto ..................... 359/849
4,632,532  12/1986  Knohl ......................... 359/848
4,775,230  10/1988  Meier ......................... 359/849
4,856,172   8/1989  Ahmed et al.
5,035,497   7/1991  Itoh .......................... 359/849
5,151,809   9/1992  Meier ......................... 359/846
5,162,951  11/1992  Sorce.

FOREIGN PATENT DOCUMENTS 0249887  12/1987  European Pat. Off. .

*Primary Examiner*—Ricky D. Shafer
*Attorney, Agent, or Firm*—Walter Ottesen

[57] ABSTRACT

The invention is directed to a stress-free support which includes two parts 1 and 2 having different linear thermal expansion coefficients. One part can, for example, be a mirror support made of Zerodur and the second part can be an aluminum support structure. A compensating stress-free support with flexure joints (121 to 126, 211 to 213, 214 to 216) increases the stiffness with respect to tilting. The stress-free support has a low weight and a low structural elevation. The entire arrangement is planar.

7 Claims, 1 Drawing Sheet

STRESS-FREE SUPPORT

FIELD OF THE INVENTION

The invention relates to a stress-free support which includes a first part, a second part and six strut units of which each two have the same length. The first part has a first linear thermal expansion coefficient and has three rotational bearings having respective rotational axes. The rotational bearings are arranged on a circle having a first radius and the three rotational axes are perpendicular to this circle. The second part has a second linear thermal expansion coefficient and has three rotational bearings having respective rotational axes. These rotational bearings are arranged on a second circle having a second radius and the three rotational axes are perpendicular to this circle. Each of the six support units connects a rotational bearing of the first part to a rotational bearing of the second part.

BACKGROUND OF THE INVENTION

A hexapod support of the kind described above is, for example, disclosed in U.S. Pat. No. 4,856,172 and is described with respect to FIG. 1B thereof. There is no explanation as to the embodiment of the joints and strut units. The bearings define an equilateral triangle on each of the first and second parts.

U.S. Pat. No. 5,162,951 discloses an optical system wherein a mirror is connected to a mount via connecting rods having flexure joints at each end. The dimensions of the parts and their thermal expansion coefficients are so configured that temperature changes can take place without stress changes on the mirror. Bending moments at the mirror are avoided in that the spacing of the mirror to the mount is varied. This is possible because the arrangement disclosed is a spatial arrangement wherein the joints are not coplanar. Each joint is connected to only one connecting rod.

European patent publication 0,249,887 discloses a high-resonance adjustable mount for a mirror. The mirror is for use in photolithography and is connected to a support via connecting pieces having a similar thermal expansion and three tangential bars having crossed flexure joints provided at both ends thereof. In this way, a stress-free suspension and an embodiment independent of temperature is obtained. The arrangement is not stiff against deflections out of the plane of the mirror because of the crossed flexure joints.

SUMMARY OF THE INVENTION

It is an object of the invention to provide a stress-free support which is improved so that high stiffness against deflections of the first part out of the plane of the second part is achieved. The arrangement is easy to assemble and to adjust as well as having reduced weight and is suitable for use in satellites.

The stress-free support of the invention includes: a first part having a first linear thermal expansion coefficient ($\alpha_1$) and having three first rotational bearings; the three first rotational bearings being arranged on a first circle having a first radius (R1) and defining respective first rotational axes perpendicular to the first circle; a second part having a second linear thermal expansion coefficient ($\alpha_2$) and having three second rotational bearings; the three second rotational bearings being arranged on a second circle having a second radius (R2) and defining respective second rotational axes perpendicular to the second circle; the first rotational bearings and the second rotational bearings all being disposed in one plane; six strut units all having the same length and having a third linear thermal expansion coefficient ($\alpha_3$); and, each of the six struts connecting one of the first rotational bearings to one of the second rotational bearings.

According to another feature of the invention, each rotational bearing is defined by at least two flexure joints having parallel axes of rotation. The two flexure joints have rotational axes which define a plane. For this reason, the arrangement is especially stiff against tilting about axes perpendicular to the actual rotational axes. This is the case when the height of the flexure joints is low and they are configured so as to be soft. The invention is also suitable for the first part which has rotational axes which define an unsymmetrical triangle.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
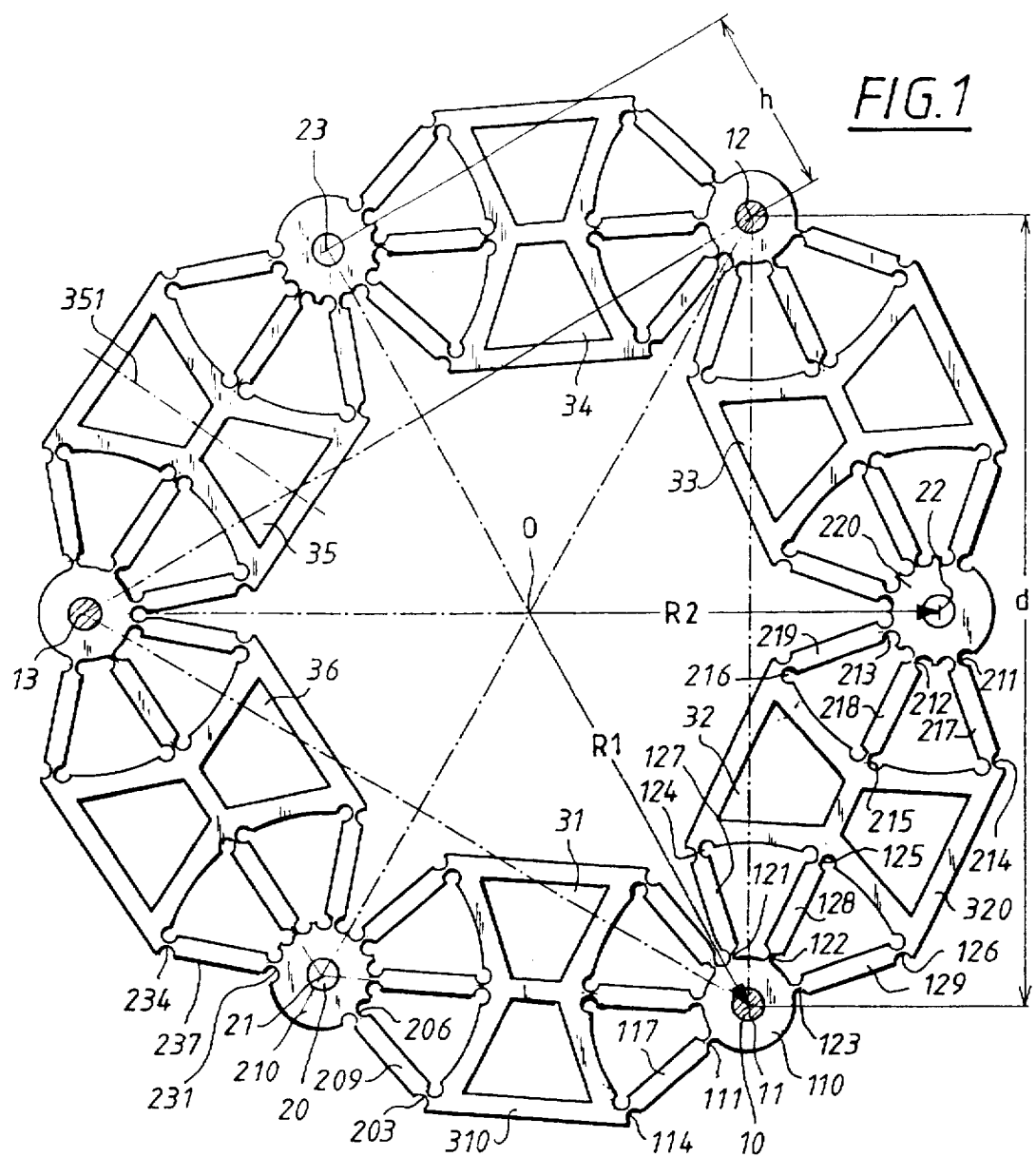
FIG. 1 shows an embodiment of the invention, in plan, wherein the compensating structure is configured as a single piece; and, FIG. 2 is a side elevation view of the embodiment of FIG. 1.
Figure 2:
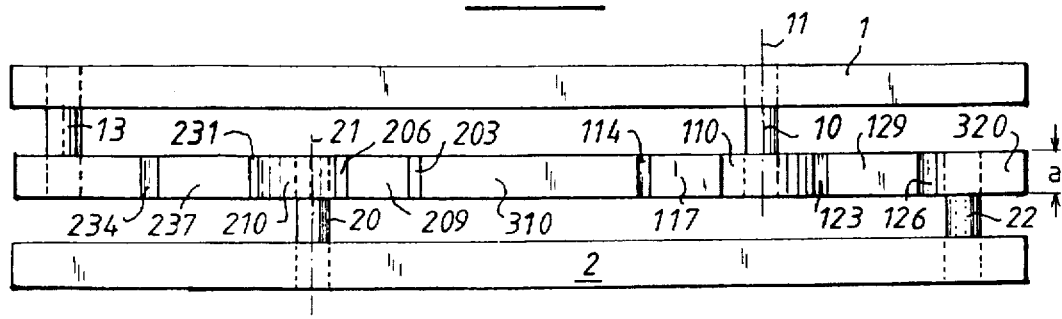

The compensating structure of the stress-free support of FIG. 1 is connected at the rotational axes (11, 12, 13) to the first part via pins 10 as shown in FIG. 2. The first part 1 is especially a mirror support made of a material having a minimum linear thermal expansion coefficient $\alpha_1$ and is, for example, glass ceramic Zerodur of Schott Glaswerke of Mainz, Germany. The rotational axes (11, 12, 13) define an equilateral triangle in this embodiment. However, any desired triangle is possible.

The compensating structure is connected at rotational axis (21, 22, 23) to a second part 2 via pins 20. Part 2 is, for example, a support structure of aluminum having a relatively large linear thermal expansion coefficient $\alpha_2$. The pins (10, 20) are preferably connected utilizing adhesive or are threadably engaged. To prevent the transmission of tilt moments, especially the pins 20 or the second part 2 is provided with crossed flexure joints in the region of the rotational axes (21, 22, 23) when the support structure is connected thereby to a further part.

The rotational axes (11, 12, 13) of the first part 1 define an equilateral triangle having the radius R1, the side length (d) and the centroid 0.

The rotational axes (21, 22, 23) of the second part 2 then define an equilateral triangle having the radius R2 and have the same centroid 0. The centroid is common also for asymmetrical axis triangles. Each of the rotational axes (for example, rotational axis 23) of the second part 2 and each two rotational axes (for example, rotational axes 12 and 13) of the first part 1 define an isosceles triangle having the base (d) and the elevation (h).

If part 1 is made of Zerodur and part 2 of aluminum and if the side length d=144.75 mm is pregiven, then for an embodiment of the compensating structure wherein thermal stresses are compensated, the elevation h is as follows: 30.273 mm for titanium; 35.114 mm for the steel alloy X12CrMoS17; and, 39.573 mm for beryllium as the material for the compensating structure of FIG. 1.

The entire arrangement of the embodiment with the detail structure of the strut units (31 to 36), have a trigonal rotational symmetry about the axis perpendicular to the plane of the drawing with the axis passing through the centroid 0. What is important is that the entire compensating structure is configured so as to be planar which is in contrast to the known hexapod arrangements. Accordingly, an offset perpendicular to this plane (as in U.S. Pat. No. 5,162,951) is excluded. The selection of materials and geometry is however limited thereby.

Each two strut units (31 to 36) are of the same length (in the embodiment shown, all units are of the same length) and are symmetrical to the center plane 351 between the two connected rotational axes (13, 23).

The strut unit 32 has the same configuration as the other strut unit and the configuration thereof between rotational axes 11 and 22 is explained below.

Three first flexure joints (121, 122, 123) lie on a circle about the rotational axis 11 on part 110 connected to the pin 10. The three first flexure joints (121, 122, 123) extend into respective radial rods (127, 128, 129) all of the same length. The three radial rods, in turn, extend into second flexure joints (124, 125, 126) and these joints again lie on a circle about the rotational axis 11. The axes of all flexure joints (121 to 126) lie parallel and are perpendicular to the plane of the drawing. The second flexure joints (124, 125, 126) are connected to the rigid center part 320 which is configured as a truss-like frame having a stiff configuration of light weight. A third set of flexure joints (214, 215, 216) is arranged on a circle about the rotational axis 22. These flexure joints, in turn, extend radially into respective rods (217, 218, 219) which extend toward the rotational axis 22. The rods (217, 218, 219) are connected to a fourth set of flexure joints (211, 212, 213) arranged on a circle about the rotational axis 22. These flexure joints are connected to the region 220 which is fixed to part 2.

A low elevation (a), as shown in FIG. 2, of the compensating structure and all elements (110, 121 to 129, 220, 211 to 219, 320) results in a high stiffness against unwanted tilting of the two rotational axes (11, 22) and an excellent movability of the rotation about the rotational axes (11, 12) with also a light construction.

Rod 128 and the flexure joints (122, 125) corresponding thereto and rod 218 and the flexure joints (212, 215) corresponding thereto are arranged on the connecting line of the two rotational axes (11, 22). The other parts are arranged symmetrical to this connecting line.

In the invention, there can be a deviation from the number and the symmetry of the rods (127, 128, 129, 217, 218, 219) and the flexure joints corresponding thereto.

The other strut units (31, 33 to 36) are configured in exactly the same manner as strut unit 32. Only those parts are identified by reference numerals which can also be seen in FIG. 2. These are the flexure joints (111, 114, 203, 206, 231, 234), the rods (117, 209, 237) and the center part 310 as well as the part 210 assigned to the rotational axis 21 and connected to the pin 20.

A one-piece compensating structure is shown in FIGS. 1 and 2. However, this compensating structure can also comprise several individual parts, preferably individual strut assemblies (31 to 36) including the flexure joints associated therewith.

It is understood that the foregoing description is that of the preferred embodiments of the invention and that various changes and modifications may be made thereto without departing from the spirit and scope of the invention as defined in the appended claims.

What is claimed is:

1. A stress-free support comprising:

a first part having a first linear thermal expansion coefficient ($\alpha_1$) and having three first rotational bearings;

said three first rotational bearings being arranged on a first circle having a first radius (R1) and defining respective first rotational axes perpendicular to said first circle;

a second part having a second linear thermal expansion coefficient ($\alpha_2$) and having three second rotational bearings;

said three second rotational bearings being arranged on a second circle having a second radius (R2) and defining respective second rotational axes perpendicular to said second circle;

said first rotational bearings and said second rotational bearings all being disposed in one plane;

six strut units pairwise having the same length and having a third linear thermal expansion coefficient ($\alpha_3$); and, each of said six strut units connecting one of said first rotational bearings to one of said second rotational bearings.

2. The stress-free support of claim 1, wherein each of said rotational bearings including at least two flexure joints having parallel axes of rotation.

3. The stress-free support of claim 1, wherein each of said strut units and the two rotational bearings interconnected thereby conjointly comprising:

at least two first flexure joints arranged on a third circle about the first rotational axis of said one of said first rotational bearings;

at least two first rods extending radially from said first rotational axis of said one of said first rotational bearings and being connected to said two first flexure joints, respectively;

at least two second flexure joints extending from said two first rods, respectively, and being arranged on a fourth circle about said first rotational axis of said one of said first rotational bearings;

a rigid center part connected to said second flexure joints;

at least two third flexure joints extending from said center part and being arranged on a fifth circle about the second rotational axis of said one of said second rotational bearings;

at least two second rods extending radially toward said second rotational axis of said one of said second rotational bearings and being connected to said two third flexure joints, respectively; and, at least two fourth flexure joints extending from said two second rods, respectively, and being arranged on a sixth circle about said second rotational axis of said one of said second rotational bearings.

4. The stress-free support of claim 3, wherein one of said first flexure joints, one of said first rods, one of said second flexure joints, one of said third flexure joints, one of said second rods and one of said fourth flexure joints all lying on a common connecting line between said first rotational axis of said one of said first rotational bearings and said second rotational axis of said one of said second rotational bearings.

5. The stress-free support of claim 3, wherein said rigid center part being configured as a truss structure.

6. The stress-free support of claim 1, wherein said first, second and third thermal expansion coefficients ($\alpha_1$, $\alpha_2$, $\alpha_3$) said first radius (R1) and said second radius (R2) all being so selected that for each temperature within a specific temperature range, the length of each one of said strut units being equal to the distance between the first rotational axis and the second rotational axis interconnected by said one of said strut units.

7. The stress-free support of claim 1, wherein said six strut units and said first and second rotational bearings conjointly defining a one-piece compensating structure.

* * * * *